UNITED STATES PATENT OFFICE.

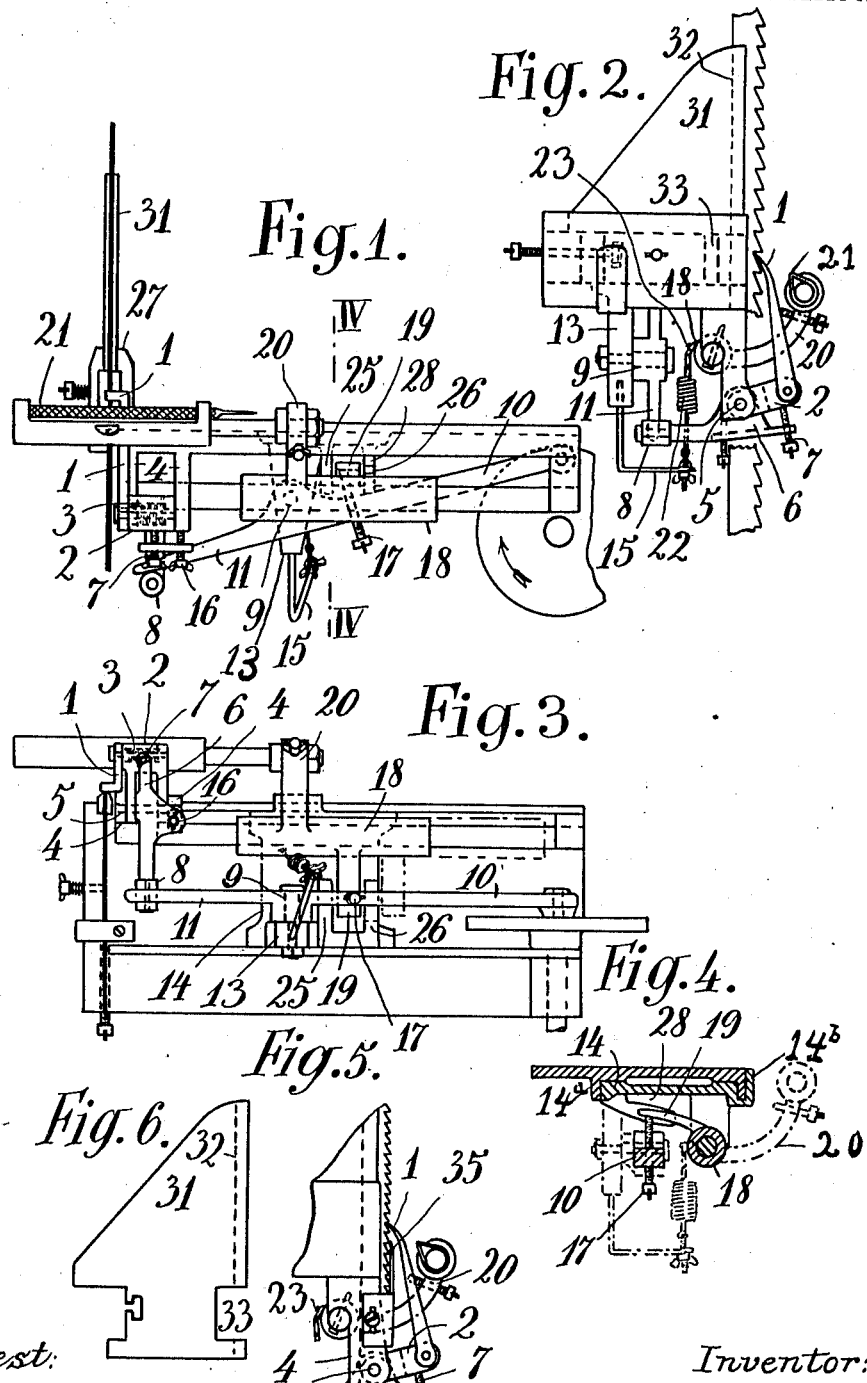

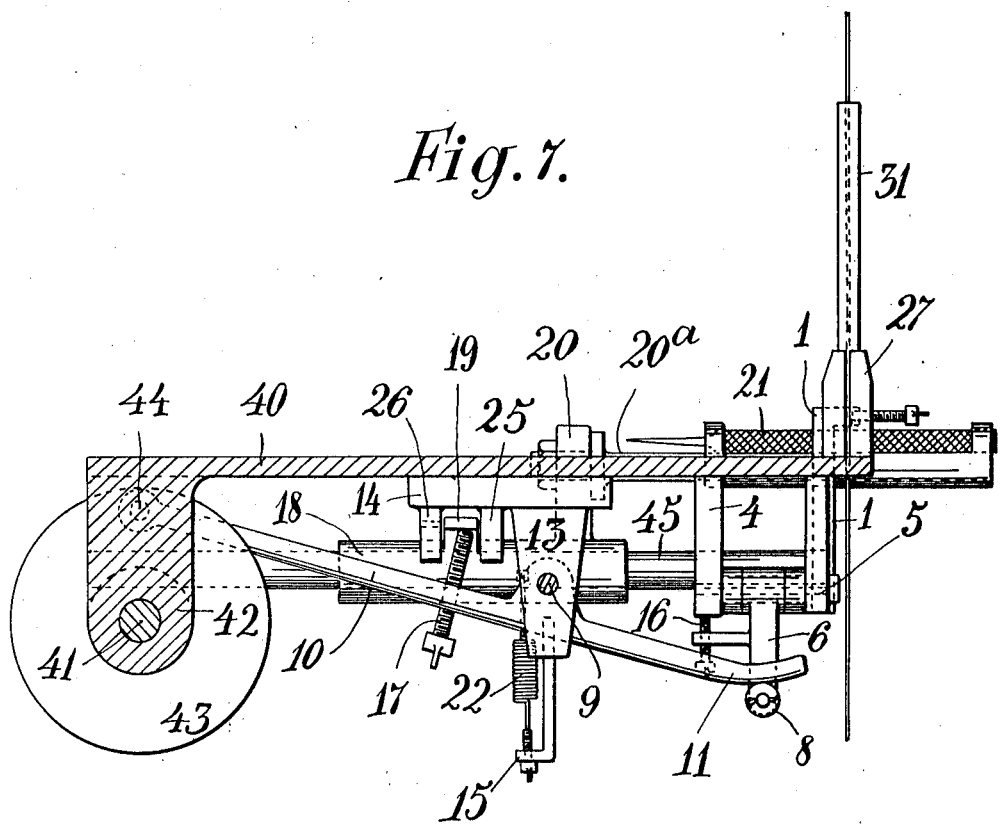

JOHAN ARNESEN, OF JELÖEN, NEAR MOSS, NORWAY.

SAW-FILING MACHINE.

1,021,295.　　　　Specification of Letters Patent.　　Patented Mar. 26, 1912.

Application filed September 26, 1910. Serial No. 583,862.

*To all whom it may concern:*

Be it known that I, JOHAN ARNESEN, a subject of the King of Norway, residing at Jelöen, near Moss, Norway, have invented certain new and useful Improvements in Saw-Filing Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to band saw filing machines, and has for its object an improved form of such machine, which is adapted to be secured to a wall or other vertical structure and to perform its work on a saw blade having a substantially vertical position, that is to say, the same position which it has in the sawing machine. By constructing the filing machine in this manner, the handling of the work is made much easier.

My invention also comprises special combinations of devices hereinafter specified and claimed.

In the annexed drawing there is shown a form of machine embodying the invention. Figure 1 is a side view; Fig. 2 is an end view, and Fig. 3 shows the machine from below; Fig. 4 is a sectional view on the line IV—IV of Fig. 1; Fig. 5 illustrates a modified arrangement; and Fig. 6 is a detail; Fig. 7 is a longitudinal section through the machine on a somewhat larger scale. This section is taken just behind the driving rod and is drawn looking toward the front.

The frame of the machine consists of a plate 40. It is adapted to be secured to a wall or a column or other vertical structure by means of a bracket which may be cast in one piece with the said plate or bolted to it (it is not shown in the drawing). The driving shaft 41 has its bearing in an arm 42 on the lower side of the frame. The shaft carries the crank disk 43 with the pin 44, to which one end of the crank rod 10 is connected. On the lower side of the frame is mounted a slide 14 between suitable guides 14$^a$ and 14$^b$; this slide has a downwardly projecting arm 13 carrying a pin 9. The crank rod 10 is pivotally connected to this pin (as clearly seen from Fig. 7) so that, as crank pin 44 revolves, a reciprocating movement is imparted to the slide.

At the front of the machine below the frame is a guide bar 45 of circular cross section; on this guide bar is mounted the file carrying slide 18, from which extends an arm 19 between two lugs 25 and 26 on the slide 14. In this manner the slide 14 carries along with it the slide 18 so that both slides reciprocate in unison. The file holder 20$^a$ for the file 21 is supported from the slide by an arm 20. A spring 22, the ends of which are secured respectively to the slide 18 and to an arm 15 (see Figs. 2 and 4), extending from the arm 13 on the slide 14, tends to hold the slide 18 and its arm 20 in such position that the file is held in contact with the saw. This spring, by its upward pull on arm 15, keeps the slide 14 pressed against the under surface of the plate 40, and in place between the guides 14$^a$ and 14$^b$, and enables the slide to be readily removed by disconnecting the spring. The arm 19 presses against a screw 17 carried by the connecting rod 11, so that by the swinging motion of the latter the arm 19 and therewith the slide 18 is caused to turn around the guide 45.

The feeding pawl 1 is pivotally mounted on the end of a short arm 2, and is held in engagement with the saw blade by means of a spiral spring 3 inserted in a boring in the outer end portion of said arm 2. This arm is pivoted on a pin 5 secured to the support 4 projecting from the frame. On this pin is also pivotally mounted an arm 6, one end of which is provided with an adjusting screw 7 engaging the outer end of said arm 2.

16 is an adjusting screw provided on the arm 6 and engaging the support 4, so as to limit the downward movement of said arm. At the other end of the arm 6 is mounted a roller 8 acted upon by an oscillating part of the crank rod 10 of the machine. In the example shown, this oscillating part is formed by an extension 11 of the crank rod.

The saw blade is guided in a slot 32 in a vertical standard 31 (Fig. 6) on the bottom of which it is resting; but in order to obtain some elasticity of the blade at the point where the file is working the said slot is here interrupted by a recess 33 in the guide 31.

In Fig. 5 is shown an arrangement by which it is rendered possible to use the same adjustment of the screws 7 and 16 when a saw blade with very small teeth as compared with the next foregoing blade is to be operated upon. This is obtained by covering the teeth below the pawl by an adjustable plate 35 the upper edge of which extends up to the point of the tooth which the pawl would normally have caught at the next operative stroke. By this means the pawl is prevented from engaging said tooth as it will slide over the same and carry with it in its continued upward movement the tooth which is lying above the first named tooth.

I claim as my invention:

1. In a band saw filing machine, a plate or table carrying a guide for the saw, a rod supported beneath said plate, a file holder carrying member mounted to have slidable and oscillating movement thereon, a file holder supported from said member, a spring tending to rock said file holder carrying member in one direction to cause the holder to press the file against the saw, a slide guided beneath the table to reciprocate parallel with said rod, parallel lugs projecting from said slide, an arm projecting from the file holder carrying member engaging between the lugs, means for reciprocating the slide, means for rocking said carrying member in opposition to the tension of the spring, and means for feeding the saw.

2. In a band saw filing machine, a plate or table carrying a guide for the saw, a rod supported beneath said plate, a file holder carrying member mounted to have slidable and oscillating movement on said rod, a slide mounted to move parallel with said rod and having depending lugs, an arm extending from the file holder carrying member and lying between said lugs for causing the parts to reciprocate in unison, a spring tending to oscillate said file holder carrying member to cause the file holder to press the file against the saw, a pitman connecting said slide with a moving part for reciprocating the slide, and a set screw carried by the pitman in rear of its pivot and having its end bearing against said arm.

3. In a band saw filing machine, a plate or table carrying a guide for the saw, a file holder carrying member mounted to have reciprocatory and oscillating movement with relation to said plate, spring means tending to rotate said member to force the file against the saw, a slide mounted to move in a path parallel to the path of movement of said member, means for causing said member and slide to reciprocate in unison while permitting oscillating movement of said member, a pitman connecting a moving part with said slide for reciprocating the latter, said pitman having a forward extension, pawl mechanism for feeding the saw, means whereby said forward extension of the pitman operates said pawl mechanism, and means carried by the pitman for oscillating said member against the tension of the spring to press the file holder away from the saw.

In testimony that I claim the foregoing as my invention, I have signed my name in presence of two subscribing witnesses.

JOHAN ARNESEN.

Witnesses:
HENRY BORDEWICH,
MARTIN GUTTMUSER.

Copies of this patent may be obtained for five cents each, by addressing the "Commissioner of Patents, Washington, D. C."